US012785598B2

(12) United States Patent
Vilar et al.

(10) Patent No.: US 12,785,598 B2
(45) Date of Patent: Nov. 3, 2026

(54) FIELD-WEAKENING STRATEGY FOR TORQUE-LOSS COMPENSATION

(71) Applicant: Deere & Company, Moline, IL (US)

(72) Inventors: Eric Vilar, Dubuque, IA (US); Yujiang Wu, Cary, NC (US); Weijin Qiu, Cary, NC (US)

(73) Assignee: Deere & Company, Moline, IL (US)

( * ) Notice: Subject to any disclaimer, the term of this patent is extended or adjusted under 35 U.S.C. 154(b) by 229 days.

(21) Appl. No.: 18/906,708

(22) Filed: Oct. 4, 2024

(65) Prior Publication Data

US 2026/0100663 A1 Apr. 9, 2026

(51) Int. Cl.
*H02P 21/22* (2016.01)

(52) U.S. Cl.
CPC .......... *H02P 21/22* (2016.02); *H02P 2207/05* (2013.01)

(58) Field of Classification Search
CPC .............................. H02P 21/22; H02P 2207/05
See application file for complete search history.

(56) References Cited

U.S. PATENT DOCUMENTS 6,965,212 B1 11/2005 Wang et al.
2022/0376642 A1* 11/2022 White ..................... H02P 21/22
2024/0348185 A1* 10/2024 Shi ..................... B60H 1/00392

FOREIGN PATENT DOCUMENTS

CN 117353614 A 1/2024

OTHER PUBLICATIONS

"The DQ Analysis of Rotary Field Machines," Dewetron GMBH, Grambach, Austria, 6 pages, (undated but admitted to be prior art).
"Temperature Effects on Motor Performance," Pittman, Harleysville, Pennsylvania, 10 pages, (undated but admitted to be prior art).
Manabu Kosaka and Hiroshi Uda, "Parameters Identification for Interior Permanent Magnet Synchronous Motor Driven by Sensorless Control," Journal of Low Frequency Noise, Vibration and Active Control, vol. 28, No. 4, 2009, pp. 269-283.
German Search Report issued in application No. 102025130966.3 dated Jul. 9, 2026, 12 pages.

* cited by examiner

*Primary Examiner* — Zoheb S Imtiaz
(74) *Attorney, Agent, or Firm* — Jerry T. Sewell; Lucian Wayne Beavers; Patterson Intellectual Property Law, PC

(57) ABSTRACT

A system and a method operate in a first mode and a second mode. In the first mode, the system and the method control the direct current and the quadrature current applied to an internal permanent magnet motor to achieve a desired rotational speed and a desired torque over a range of internal operating temperatures of the motor without exceeding a maximum stator current. If a calculated stator current exceeds a maximum stator current, the system and the method operate in the second mode wherein the system and the method control the direct current and the stator current to maintain the calculated stator current below the maximum stator current.

8 Claims, 6 Drawing Sheets

FIELD-WEAKENING STRATEGY FOR TORQUE-LOSS COMPENSATION

FIELD OF THE DISCLOSURE

The present disclosure relates generally to electric motors that provide power in environments where the temperature varies of a wide range.

BACKGROUND

Electric motors provide rotational torque to a load. Some loads require a constant torque at a constant speed; however, other loads may operate at different speeds and require different torques under varying conditions. For example, an internal permanent magnet (IPM) motor may be driven by a drive circuit that controls the drive current to the motor to control the speed of the motor and to control the torque provided by the motor.

The torque of an electric motor produced by a given drive current is not constant at all temperatures. For example, in an extremely cold environment, an electric motor may produce less torque or may produce nearly zero torque. The decrease in torque is likely caused, at least in part, by the flux density ($\lambda_{pm}$) of the internal permanent magnet of the motor increasing as the temperature of the magnet decreases. The increased flux density causes increased current flow through the stator windings, which increases the voltage drop across the stator windings. The increased voltage drop increases an measured estimated terminal voltage. An existing terminal voltage compensation system includes an algorithm that accesses a torque-to-current lookup table and attempts to keep the magnitude of the current vector constant by increasing the gamma angle (γ), wherein the gamma angle is defined as the angle from the positive q-axis to the current vector. If the current vector is aligned with the positive q-axis, the gamma angle is zero degrees. If the current vector is aligned with negative d-axis, the gamma angle is 90 degrees. This known algorithm avoids overheating the machine by constraining the current vector magnitude. This known algorithm also complies with the terminal voltage constraints by finding an operating point on the voltage eclipse. However, the known algorithm is not optimum for maintaining torque production at a desired value.

In certain industrial and other applications, when an operating point obtained from the lookup table violates the terminal voltage constraints, maintaining torque production is a higher priority than constraining the current level to avoid overheating. Thus, a new algorithm is needed to maintain torque production while the machine is running out of the terminal voltage at colder temperatures.

BRIEF SUMMARY

In view of the foregoing, a need exists for a system and method for compensating for torque inaccuracy caused by cold magnets in an internal permanent magnet motor.

The current disclosure describes a system that compensate for reduction in motor torque in a cold-temperature environment.

One aspect of the embodiments disclosed herein is a system and a method that operate in a first mode and a second mode. In the first mode, the system and method control the direct current and the quadrature current applied to an internal permanent magnet motor to achieve a desired rotational speed and a desired torque over a range of internal operating temperatures of the motor without exceeding a maximum stator current. If a calculated stator current exceeds a maximum stator current, the system and method operate in the second mode wherein the system and method control the direct current and the stator current to maintain the calculated stator current below the maximum stator current.

One aspect of the embodiments disclosed herein is a system for controlling the direct current and the quadrature current applied to an internal permanent magnet (IPM) motor to achieve a desired rotational speed and a desired torque over a range of internal operating temperatures of the motor without exceeding a maximum stator current, wherein an increase in stator current causes an increase in a measured terminal voltage. The system comprises a first current generator configured to respond to a measured terminal voltage in excess of a maximum terminal voltage to modify an initial direct current magnitude to a first modified direct current magnitude and to modify an initial quadrature current magnitude to a first modified quadrature current magnitude. The system further comprises a mode current generator configured to generate a second modified direct current having a magnitude as a maximum of the first modified direct current magnitude and a maximum stator current magnitude. The second current generator is further configured to generate a second modified quadrature current magnitude responsive to a vector difference between the second modified direct current magnitude and the maximum stator current magnitude. The system further includes a current selector responsive to a calculated stator current magnitude based on the first modified direct current magnitude and the first modified quadrature current magnitude. The current selector operates in a first mode when the calculated stator current magnitude is no greater than the maximum stator current magnitude, and routes the first modified direct current magnitude and the first modified quadrature current magnitude to the motor. The current selector operates in a second mode when the calculated stator current magnitude is greater than the maximum stator current magnitude, and routes the second modified current magnitude and the second modified quadrature current magnitude to the motor.

Another aspect of the embodiments disclosed herein is a method for controlling the direct current and the quadrature current applied to an internal permanent magnet (IPM) motor to achieve a desired rotational speed and a desired torque over a range of internal operating temperatures of the motor without exceeding a maximum stator current. The method comprises applying a voltage to the motor. The method selects an initial commanded direct current value and an initial commanded quadrature current value based on the desired rotational speed and the desired torque. The method applies the initial commanded direct current value to the motor. The method applies the initial commanded quadrature current value to the motor. The method compares a measured terminal voltage of the motor with a maximum terminal voltage. The measured terminal voltage varies with the internal operating temperature of the motor. When the measured terminal voltage exceeds the maximum terminal voltage, the method generates a direct current differential value responsive to a difference between the measured terminal voltage and the maximum terminal voltage, and generates a quadrature current differential value in response to the direct current differential value. The method adjusts the initial commanded direct current value to a first modified direct current value in response to the direct current differential value, and adjusts the initial commanded quadrature current value to a first modified quadrature current value in response to the quadrature current differential value. The method applies the first modified direct current value and the first modified quadrature current value to the motor.

In certain embodiments in accordance with this aspect, the method generates a calculated absolute magnitude of the stator current value as the vector sum of the first modified direct current value and the first modified quadrature current value. The method generates a second modified direct current value having an absolute magnitude that is a smaller of an absolute magnitude of the first modified direct current value and an absolute magnitude of a maximum stator current value. The method generates a second modified quadrature current value having an absolute magnitude that is a vector difference of the magnitude of the maximum stator current value and the second modified direct current value. The method compares the calculated magnitude of the stator current value to a maximum magnitude of the stator current value. The method selectively applies the second modified direct current value and the second modified quadrature current value to the motor when the calculated magnitude of the stator current value exceeds the maximum magnitude of the stator current value.

Another aspect of the embodiments disclosed herein is a system for controlling the direct current and the quadrature current applied to an internal permanent magnet (IPM) motor to achieve a desired rotational speed and a desired torque over a range of internal operating temperatures of the motor without exceeding a maximum stator current, wherein an increase in stator current causes an increase in a measured terminal voltage. The system comprises an initial current value generator that generates an initial direct current value and an initial quadrature current value responsive to a selected input voltage, a selected speed, and a selected torque. An integrator integrates a difference in the measured terminal voltage in excess of a maximum terminal voltage and generates a direct current difference value. A quadrature current difference generator receives the direct current difference value and generates a quadrature current difference value. A first modified direct current generator adds the direct current difference value to the initial direct current value to generate a first modified direct current value. A first modified quadrature current generator adds the quadrature current difference value to the initial quadrature current value to generate a first modified quadrature current value. The system further includes an output system that applies the first modified direct current value as an applied direct current value to the motor and that applies the first modified quadrature current value as an applied quadrature current value to the motor.

In certain embodiments in accordance with this aspect, the system includes a second modified direct current generator that generates a second modified direct current value having an absolute magnitude that is the lesser of an absolute magnitude of the first modified direct current value and an absolute magnitude of a maximum stator current value. The system further includes a second modified quadrature current generator that generates a second modified quadrature current value having an absolute magnitude that is a vector difference between the maximum stator current value and the second modified quadrature current value. The system further includes a current selector in the output system having a first mode and a second mode. In the first mode, the current selector selects the first modified direct current value as the applied direct current value and selects the first modified quadrature current value as the applied quadrature current value. In the second mode, the current selector selects the second modified direct current value as the applied direct current value and selects the second modified quadrature current value as the applied quadrature current value. In certain embodiments in accordance with this aspect, the current selector operates in the first mode when the calculated stator current magnitude is no greater than the maximum stator current magnitude, and the current selector operates in the second mode when the calculated stator current magnitude is greater than the maximum stator current magnitude. In certain embodiments in accordance with this aspect, the maximum stator current value is stored in a lookup table indexed by a selected torque, a selected speed, and a selected applied voltage.

In certain embodiments in accordance with this aspect, the initial current value generator comprises a lookup table that stores a plurality of initial direct current values and a plurality of initial quadrature current values indexed by a selected torque, a selected speed, and a selected applied voltage.

Numerous objects, features, and advantages of the embodiments set forth herein will be readily apparent to those skilled in the art upon reading of the following disclosure when taken in conjunction with the accompanying drawings.

DETAILED DESCRIPTION

Figure 1:
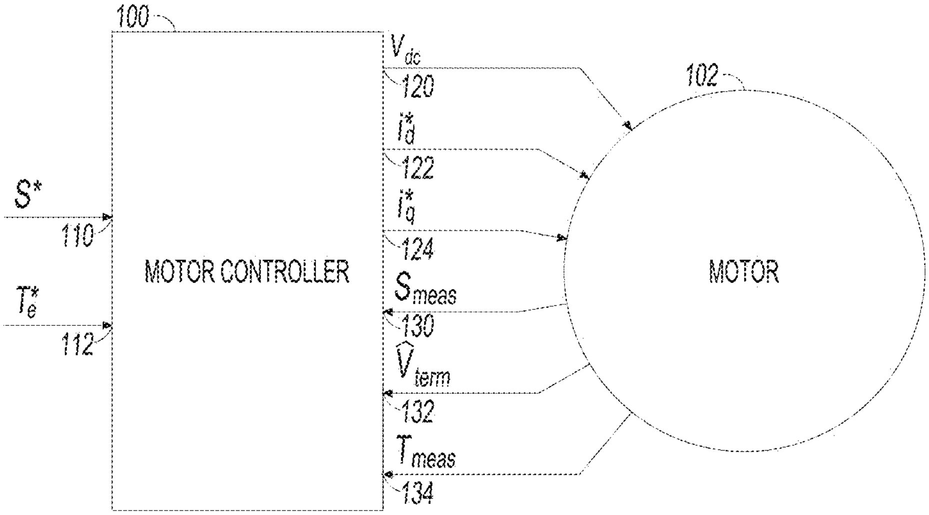
FIG. 1 illustrates a simplified block diagram of an existing motor control system that drives an internal permanent magnet (IPM) motor.

FIG. 1 a simplified block diagram of an existing motor control system 100 for controlling the speed and torque of an exemplary internal permanent magnet (IPM) motor 102. The motor control system is responsive to a commanded motor speed S* (in RPM) on a first input 110 and to a desired commanded torque value $$T_e^*$$

(in Newton-meters (Nm)) on a second input 112. A first output 120 of the motor control system provides an applied voltage $V_{dc}$ to the motor. A second output 122 of the motor control system provides a commanded direct current $$I_d^*$$

to the motor. A third output 124 of the motor control system provides a commanded quad $$I_q^*$$

to the motor. The motor control system receives a measured rotational speed value $S_{meas}$ from the motor on a third input 130 and receives an measured estimated terminal voltage $\hat{V}_{term}$ from the motor on a fourth input 132. The motor control system receives a measured torque $T_{meas}$ from the motor on a fifth input 134.

The existing motor control system 100 is responsive to the commanded motor speed S* and the commanded torque $$T_e^*$$

and is further responsive to the measured torque $T_{meas}$ and the measured speed $S_{meas}$ to vary the commanded direct current $$I_d^*$$

and the commanded quadrature current $$I_q^*$$

to drive the motor 102 at the commanded motor speed and to generate the commanded torque at the commanded motor speed.

The existing motor control system 100 is further responsive to the measured terminal voltage $\hat{V}_{term}$ from the motor 102 to protect the motor from excessive stator current $I_s$. The measured terminal voltage increases as the stator current increases. Thus, the measured terminal voltage can be used to determine whether the stator current is approaching an unsafe magnitude. The motor control system illustrated in FIG. 1 is configured with a terminal voltage compensation algorithm that maintains a substantially constant speed and a substantially constant stator current. The algorithm in the existing motor control system is responsive to changes in operating conditions to vary the magnitude of the applied direct current to maintain the desired rotational speed. When the magnitude of the measured terminal voltage increases to indicate an increased stator current, the algorithm adjusts the magnitudes of the applied direct current and the applied quadrature current to maintain a substantially constant stator current $I_s$. As discussed below the terminal voltage compensation algorithm of the existing motor control system reduces the torque of the motor at colder operating temperatures of the permanent magnet such that the motor may not be able to provide sufficient torque for machinery coupled to the motor.

The motor 102 operates in the second quadrant when motoring and in the third quadrant when generating. The direct current has a negative magnitude in both quadrants; and the quadrature current has a positive magnitude in the second quadrant and a negative current in the third quadrant. In the following descriptions, unless otherwise stated, when two magnitudes are compared, the comparisons are based on the unsigned magnitudes of the currents. Thus, for example, a direct current value of −140 amperes has a greater magnitude than a direct current value of −130 amperes.

Figure 2:
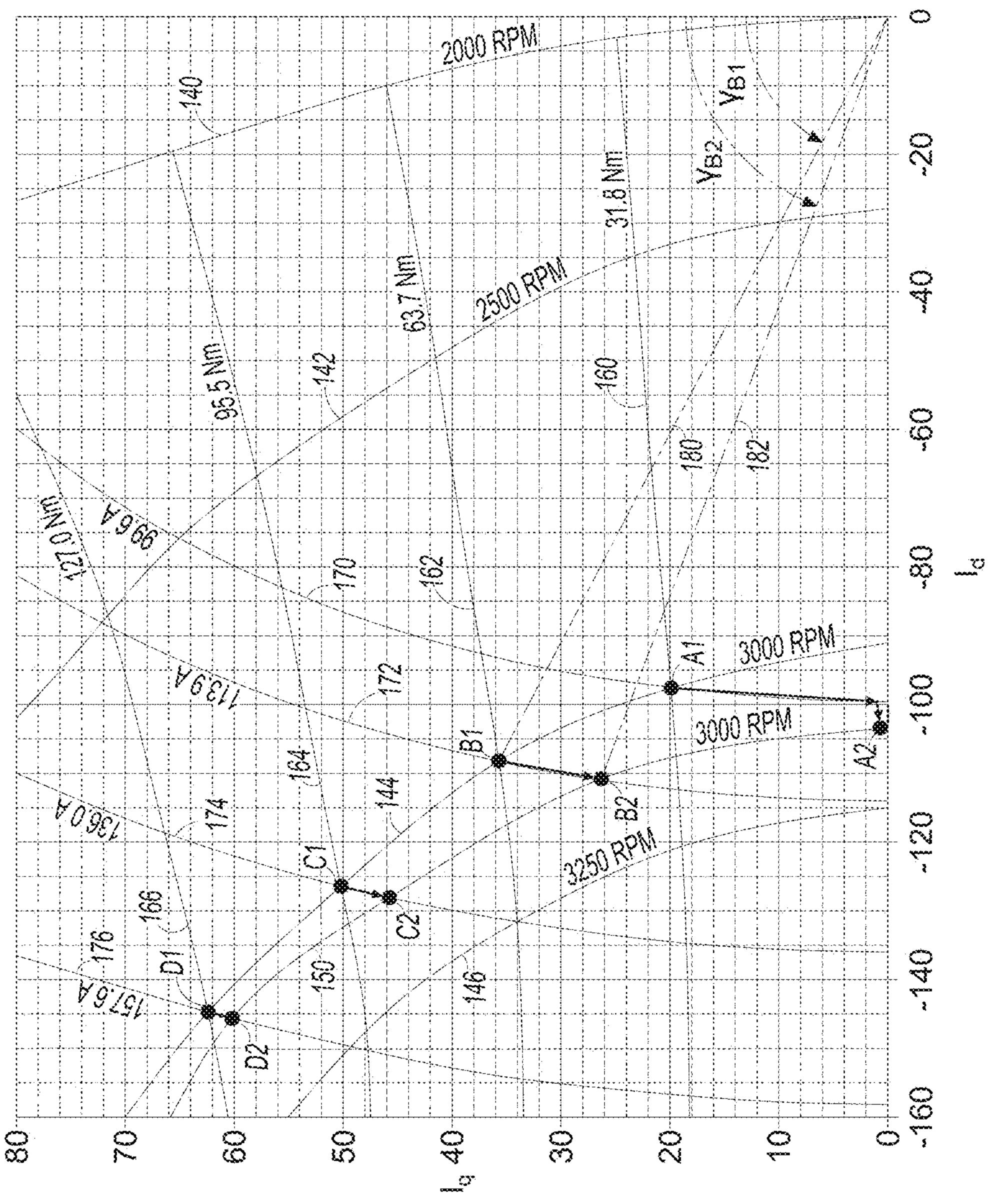
FIG. 2 illustrates graphs of a stator currents, torques, and rotational velocities of the existing motor control system and motor of FIG. 1 at combinations of direct current $I_d$ and quadrature current $I_q$ applied to the motor, the graphs showing the reduction of torque at colder operating temperatures.

FIG. 2 illustrates graphs of the torque and rotational speed of the motor 102 controlled by the existing motor control system 100, which implements an existing terminal voltage compensation algorithm having the above-described issue when operating the motor in colder environments. The existing terminal voltage compensation algorithm operates with a fixed input voltage of 400 volts (400 V). The existing terminal voltage compensation algorithm controls the operating speed and the torque of the motor by controlling the direct current $I_d$ and the quadrature current $I_q$ applied to the motor. The existing terminal voltage compensation algorithm selects the direct current and the quadrature current by accessing a lookup table (not shown) within the existing motor control system 100 of FIG. 1. The lookup table is indexed by the desired speed and by the desired torque. The graphs in FIG. 2 are indexed by the direct current $I_d$ on the horizontal axis and the quadrature current $I_q$ on the vertical axis. Both currents are in amperes (A). The direct current $I_q$ varies from 0 A to −160 A. The quadrature current $I_q$ varies from 0 A to 80 A. The negative direct current values and the positive quadrature current values result from the operation of the motor in the second quadrant.

In FIG. 2, a first rotational speed graph 140 intersects the x-axis ($I_q$=0 A) at approximately 0 A of direct current $I_d$. The first rotational speed graph curves upward and to the left to intersect a maximum indirect current $I_q$ of 80 A at approximately −26 A of direct current $I_d$. The first rotational speed graph shows the combinations of direct current and indirect current that maintain the rotational speed of the motor 102 at approximately 2,000 RPM at 400 V of applied voltage. The values shown are based on operation of the motor when the temperature of the permanent magnet in the motor is approximately 80 degrees centigrade (80° C.).

A second rotational speed graph 142 for 2,500 RPM extends from the x-axis ($I_q$=0 A) at a direct current $I_d$ of approximately −28 A to a direct current value of approximately −102 A at the maximum indirect current $I_q$ of 80 A when the temperature of the permanent magnet at approximately 80° C.

A third rotational speed graph 144 for 3,000 RPM extends from the x-axis ($I_q$=0 A) at a direct current $I_d$ of approximately −91 A to a direct current value of approximately −160 A at an indirect current $I_q$ of approximately 70 A when the temperature of the permanent magnet at approximately 80° C.

A fourth rotational speed graph 146 for 3,250 RPM extends from the x-axis ($I_q$=0 A) at a direct current $I_d$ of approximately −116 A to a direct current value of approximately −160 A at an indirect current $I_q$ of approximately 57 A when the temperature of the permanent magnet at approximately 80° C.

A fifth rotational speed graph 150 represents a rotational speed of 3,000 RPM when the temperature of the permanent magnet is approximately 30° C. The fifth rotational speed graph is discussed below.

Four exemplary commanded torque graphs are illustrated in FIG. 2. A first torque graph 160 illustrates a first torque of approximately 31.8 newton-meters (Nm) produced by a first set of commanded combinations of direct current $I_d$ and quadrature current $I_q$. A second torque graph 162 illustrates a second torque of approximately 63.7 Nm produced by a second set of commanded combinations of direct current and quadrature current. A third torque graph 164 illustrates a third torque of approximately 95.5 Nm produced by a third set of commanded combinations of direct current and quadrature current. A fourth torque graph 166 illustrates a fourth torque of approximately 127.3 Nm produced by a fourth set of commanded combinations of direct current and quadrature current.

FIG. 2 also illustrates four graphs of constant stator currents ($I_s$) wherein the stator current is the vector sum of the direct current $I_d$ and the quadrature current $I_q$ as follows:

$$I_s = \left|\sqrt{I_d^2 + I_q^2}\right| \quad (1)$$

A first stator current graph 170 in FIG. 2 represents the combinations of direct current $I_d$ and quadrature current $I_q$ to produce a stator current $I_s$ of approximately 99.6 A as determined by the foregoing Equation (1). For example, when the quadrature current is 0 A, the direct current is approximately −99.6 A. When the quadrature current is 80 A, the direct current is approximately −59.3 A.

A second stator current graph 172 in FIG. 2 represents the combinations of direct current $I_d$ and quadrature current $I_q$ to produce a stator current $I_s$ of approximately 113.9 A. The direct current varies from approximately −113.9 A at a quadrature current of 0 A to approximately −81.1 A at a quadrature current of 80 A.

A third stator current graph 174 represents the combinations of direct current $I_d$ and quadrature current $I_q$ to produce a stator current $I_s$ of approximately 136.1 A. The direct current varies from approximately −136.0 A at a quadrature current of 0 A to approximately −110.1 A at a quadrature current of 80 A.

A fourth stator current graph 176 represents the combinations of direct current $I_d$ and quadrature current $I_q$ to produce a stator current $I_s$ of 157.6 A. The direct current varies from approximately −157.6 A at a quadrature current of 0 A to approximately −135.8 A at a quadrature current of 80 A.

The following discussion is based on the third rotational speed graph 144 of FIG. 1 for the motor 102 operating at 3,000 RPM; however, the problem discussed below also occurs at other rotational speeds.

As a first example of the operation of the existing terminal voltage compensation system to produce a desired torque and a desired speed, a commanded torque value $$T_e^*$$

of 31.4 Nm is selected and a motor speed of 3,000 RPM is also selected. At 80° C., the 3,000 RPM speed graph 144 intersects the first torque graph 160 for 31.8 Nm at an initial first operating point A1 corresponding to a direct current $I_d$ of approximately −97.6 A and a quadrature current $I_q$ of approximately 19.9 A. In accordance with Equation (1), the stator current at the initial first operating point A1 results in a stator current $I_s$ of approximately 99.6 A such that the initial first operating point falls on the first stator current graph 170.

As a second example of the operation of the existing terminal voltage compensation system, a commanded torque value $$T_e^*$$

of 63.7 Nm is selected and a motor speed of 3,000 RPM is also selected. At 80° C., the 3,000 RPM speed graph 144 intersects the second torque graph 162 for 63.7 Nm at an initial second operating point B1 corresponding to a direct current $I_d$ of approximately −108.2 A and a quadrature current $I_q$ of approximately 35.7 A. In accordance with Equation (1), the stator current at the initial second operating point results in a stator current $I_s$ of approximately 113.9 A such that the initial second operating point B1 falls on the third stator current graph 172.

As a third example of the operation of the existing terminal voltage compensation system, a commanded torque value $$T_e^*$$

of 95.5 Nm is selected and a major speed of 3,000 RPM is also selected. At 80° C., the 3,000 RPM speed graph 144 intersects the third torque graph 164 for 95.5 Nm at an initial third operating point C1 corresponding to a direct current $I_d$ of approximately −126.5 A and a quadrature current $I_q$ of approximately 50.2 A. In accordance with Equation (1), the stator current at the initial third operating point C1 results in a stator current $I_s$ of approximately 136.1 A such that the initial third operating point falls on the third stator current graph 174.

As a fourth example of the operation of the existing terminal voltage compensation system to produce a desired torque and a desired speed, a commanded torque value $$T_e^*$$

of 127.3 Nm is selected and a commanded motor speed S* of 3,000 RPM is also selected. At 80° C., the 3,000 RPM speed graph 144 intersects the fourth torque graph 166 for 127.3 Nm at an initial fourth operating point D1 corresponding to a direct current $I_d$ of approximately −144.7 A and a quadrature current $I_q$ of approximately 62.4 A. In accordance with Equation (1), the stator current at that operational point of direct current and quadrature current results in a stator current $I_s$ of approximately 157.6 A such that the initial fourth operating point D1 falls on the fourth stator current graph 176.

When operating at 80° C., the measured torques $T_{meas}$ for one embodiment of the motor 102 are close to the commanded torque values $$T_e^*.$$

For example, in one embodiment in accordance with FIG. 1, a commanded torque of commanded torque value of 31.8 Nm results in a measured torque of approximately 31.7 Nm when the motor 102 is operating at the initial first operating point A1. A commanded torque value of 63.7 Nm results in a measured torque of approximately 64.1 Nm when the motor is operating at the initial second operating point B1. A commanded torque value of 95.5 Nm results in a measured torque of approximately 95.8 Nm when the motor is operating at the initial third operating point C1. A 127.3 Nm results in measured torque of approximately 127.0 Nm when the motor is operating at the initial fourth operating point D1.

The existing motor control system 100 operates to maintain the speed of the motor at the desired RPM and to maintain the stator current vector $I_s$ at an initial fixed magnitude in response to changes in the terminal voltage. As discussed above, the terminal voltage can change in response to changes in the flux density ($\lambda_{pm}$) of the internal permanent magnet of the motor 102 (FIG. 1). For example, when the motor is operated in an extremely cold environment, the temperature of the internal magnet may only reach an operating temperature of 30° C. instead of the usual operating temperature of 80° C. The reduced temperature of the magnet causes the flux density of the magnet to increase. The increased flux density causes the stator current to increase. The increased stator current causes the terminal voltage to increase. The existing terminal voltage compensation system responds to the increased terminal voltage and the increased stator current by shrinking the voltage eclipse to a new curve 150 while continuing to maintain the desired motor speed of 3,000 RPM. The foregoing effect is illustrated in FIG. 2, for example, by moving the initial second operating point B1 to a new second operating point B2 for a commanded torque value $$T_e^*$$

63.7 Nm. As illustrated, the new second operating point B2 is on the second constant 113.9 A stator current graph 172 as before; however, the new second operating point B2 corresponds to a greater magnitude of the direct current $I_d$ of approximately −110.8 A and a lower magnitude of the quadrature current $I_q$ of approximately 26.3 A.

The new magnitudes of the direct current $I_d$ and the quadrature current $I_q$ result in a new gamma angle $\gamma$, wherein the gamma angle is defined above as the angle from the positive q-axis to a current vector. In FIG. 2, a first gamma angle $\gamma_{B1}$ is the angle from a first vector 180 extending from the origin ($I_d$=0, $I_q$=0) to the initial second operating point B1; and a second gamma angle $\gamma_{B2}$ is the angle from a second vector 182 extending from the origin to the new second operating point B2. In the example discussed above, the first gamma angle is approximately 71.8 degrees, and the second gamma angle is approximately 76.5 degrees. The scales of the x-axis and the y-axis are different. The gamma angles are based on the numerical values rather than the visual appearances of the angles as illustrated in FIG. 2.

Because the speed has been maintained at a substantially constant 3,000 RPM with a reduced quadrature current $I_q$, the motor 102 is no longer able to produce the commanded torque value $$T_e^*$$

of 64.1 Nm at the new second operating point B2. In the illustrated example, the measured torque $T_{meas}$ at the reduced quadrature current is approximately 45 Nm.

As further illustrated in FIG. 2, the effect of the increased direct current $I_d$ at the colder operating temperature of 30° C. causes the existing motor control system 100 to shift the other operating points (A1, C1, D1) when the motor 102 is operating at other commanded torque values $$T_e^*.$$

For example, the measured torque value $T_{meas}$ at the initial first operating point A1 shifts along the 99.6 A stator current graph 170 to a new first operating point A2 wherein the motor only produces approximately 0 Nm of measured torque instead of the 31.7 Nm of commanded torque value. Similarly, the measured torque value at the initial third operating point C1 shifts along the 133.0 A stator current graph 174 to a new second operating point C2 wherein the motor only produces approximately 88.2 Nm of measured torque instead of the 96.8 Nm commanded torque value. Similarly, the measured torque value at the initial fourth operating point D1 shifts along the 157.6 A stator current $I_s$ graph 176 to a new first operating point D2 wherein the motor only produces approximately 124.8 Nm of measured torque instead of the 127.0 Nm commanded torque value. Note that at the lower commanded torque values (e.g., at the new second operating point A2), the existing motor control system is not able to maintain a positive measured torque value because the measured torque reaches 0 Nm when the quadrature current $I_q$ reaches 0 A.

As shown in FIG. 2, the shift in the operating points causes the four second operating points A2, B2, C2, D2 to lie on the shifted rotational speed graph 150 for the rotational speed of 3,000 RPM.

The foregoing commanded and measured values illustrated in the graphs of FIG. 2 are summarized in the following table:

| Motoring at 400 Vdc & 3,000 RPM | | | | | | | | | | | |
|---|---|---|---|---|---|---|---|---|---|---|---|
| Points | T* | $T_{q80}$ | $T_{q30}$ | $I_{d80}$ | $I_{d30}$ | $I_{q80}$ | $I_{q30}$ | $I_{s80}$ | $I_{s30}$ | $\gamma_{80}$ | $\gamma_{30}$ |
| $D_n$ | 31.8 | 31.7 | −8.3 | −97.6 | −103.4 | 19.9 | 0.7 | 99.6 | 103.4 | 78.5 | 89.6 |
| $C_n$ | 63.7 | 64.1 | 45.0 | −108.2 | −110.8 | 35.7 | 26.3 | 113.9 | 113.9 | 71.8 | 76.6 |
| $B_n$ | 95.5 | 96.8 | 88.2 | −126.4 | −128.3 | 50.2 | 45.4 | 136.1 | 136.1 | 68.0 | 70.5 |
| An | 127.3 | 127.0 | 124.8 | −144.7 | −146.2 | 62.4 | 60.5 | 157.6 | 158.2 | 66.7 | 67.5 |

In the foregoing table:
T* is the commanded torque;
$T_{q80}$ is the measured torque at 80° C.;
$T_{q30}$ is the measured torque at 30° C.;
$I_{d80}$ is the direct current at 80° C.;
$I_{d30}$ is the direct current at 30° C.;
$I_{q80}$ is the quadrature current at 80° C.;
$I_{q30}$ is the quadrature current at 30° C.; $I_{s80}$ is the stator current at 80° C.;
$I_{s30}$ is the stator current at 30° C.;
$\gamma_{80}$ is the gamma angle at 80° C.; and
$\gamma_{30}$ is the gamma angle at 30° C.

The foregoing effect illustrated in FIG. 2 and in the foregoing table is more pronounced if the temperature of the permanent magnet decreases further.

Figure 3:
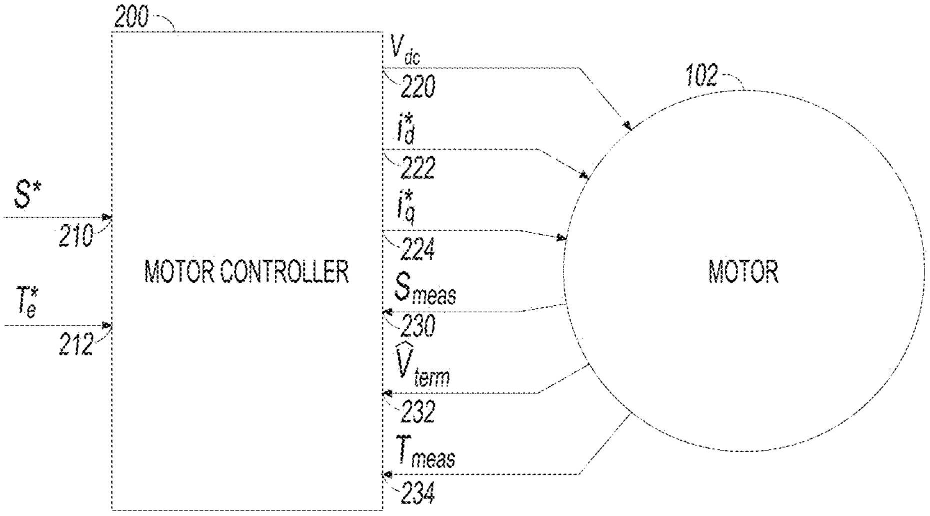
FIG. 3 illustrates a simplified block diagram of an improved motor control system that drives the motor of FIG. 1.

FIG. 3 illustrates an improved motor control system 200 to driver the motor 102. The improved motor control system implements an algorithm that overcomes the deficiencies of the existing motor control system 100 of FIG. 1 with respect to the reduction of the measured torque when the temperature of the permanent magnet deceases. The improved motor control system is responsive to a commanded motor speed S* on a first input 210 and to a desired commanded torque value $$T_e^*$$

on a second input unit 212. A list output 220 of the motor control system provides an applied voltage $V_{dc}$ to the motor. A second output 222 of the motor control system provides the commanded direct current $$I_d^*$$

to the motor. A third output 224 of the motor control system provides the commanded quadrature current $$I_q^*$$

to the motor. The motor control system receives a measured rotational speed value $S_{meas}$ from the motor on a third input 230 and receives the measured estimated terminal voltage $\hat{V}_{term}$ from the motor on a fourth input 232. The motor control system receives a measured torque $T_{meas}$ from the motor on a fifth input 234.

The improved motor control system 200 of FIG. 3 is responsive to the commanded motor speed S* and the commanded torque $$T_e^*$$

and is further responsive to the measured torque $T_{meas}$ and the measured speed $S_{meas}$ to vary the commanded direct current $$I_d^*$$

and the commanded quadrature current $$I_q^*$$

to drive the motor 102 at the command motor speed with the commanded torque over a broader range of the temperature of the internal permanent magnet of the motor.

Unlike the previously described motor control system 100 of FIG. 1, which varies the direct current and the quadrature current to maintain a fixed stator current as the measured terminal voltage increases, the improved motor control system 200 of FIG. 3 operates in a first mode and a second mode. As described below, in the first mode, the improved motor control system varies the direct current and the quadrature current to maintain a fixed torque over a range of stator currents and measured terminal voltages $\hat{V}_{term}$ until a calculated stator current increases to a maximum allowed magnitude. When the stator current reaches the maximum allowed magnitude, the improved motor control system operates in the second mode to vary the direct current and the quadrature current to maintain the stator current at or below the maximum allowed magnitude.

Figure 4:
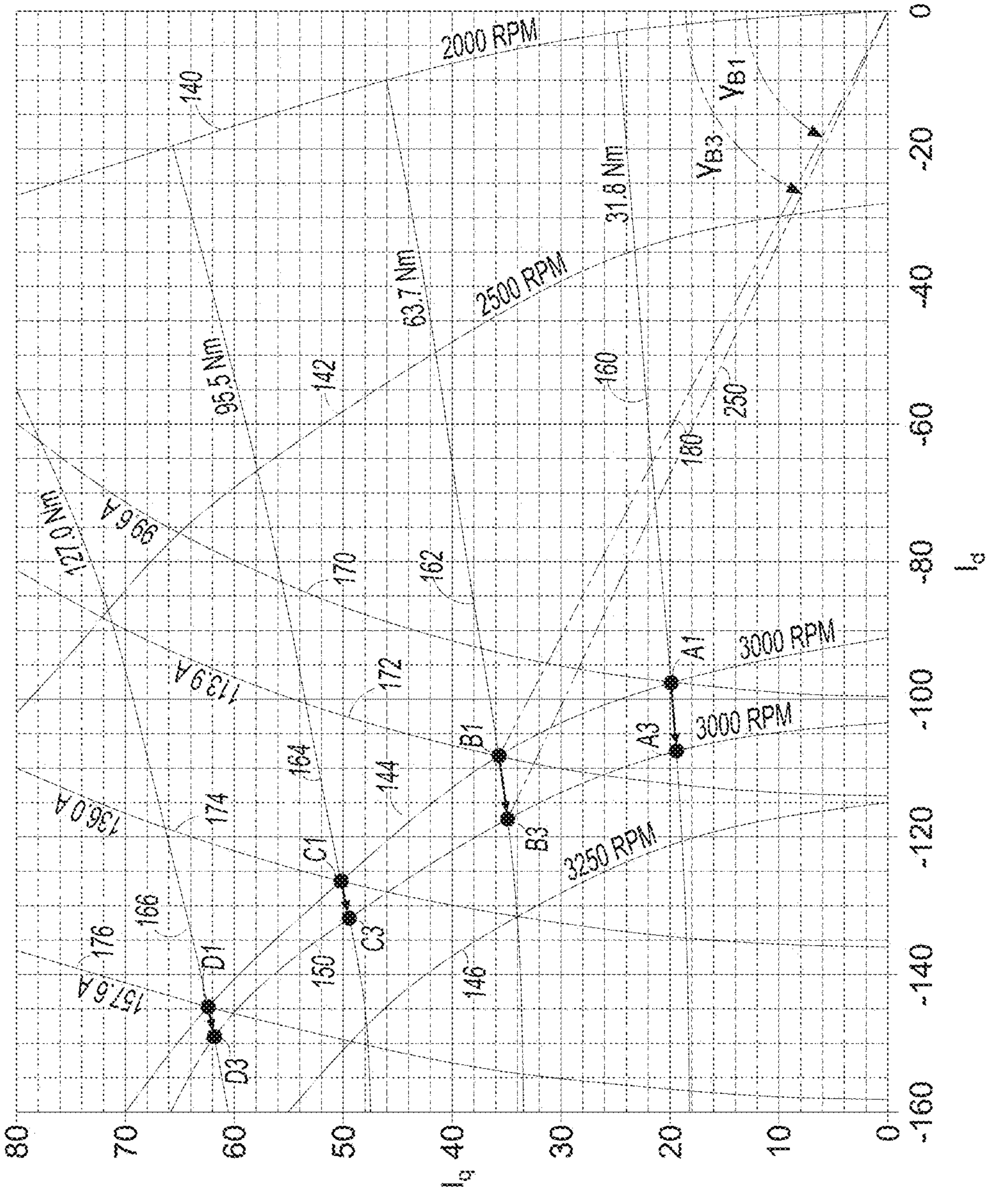
FIG. 4 illustrates graphs of a stator currents, torques, and rotational velocities of the improved motor control system and motor of FIG. 3 at combinations of direct current $I_d$ and quadrature current $I_q$ applied to the motor, the graphs showing the maintenance of a substantially constant torque at colder operating temperatures.

FIG. 4 illustrates a set of graphs for the improved motor control system 200 of FIG. 3, which are similar to the set of graphs of FIG. 2 for the existing motor control system 100 of FIG. 1. In FIG. 4, like graphs and initial operating points A1, B1, C1, D1 are labeled as in FIG. 2; however, in FIG. 4, respective third operating points A3, B3, C3, D3 illustrate a desired response that does not substantially change the respective measured torques at the respective third operating points. Instead of adjusting the direct current $I_d$ and the quadrature current $I_q$ to maintain a constant stator current $I_s$ as in the previously described embodiment, the algorithm implemented in the improved control system 200 adjusts the two currents to maintain the measured torque $T_{meas}$ at values substantially the same as the commanded torque value $$T_e^*$$

and the commanded motor speed S*. Thus, although the voltage ellipse represented by the shifted speed graph 150 is reduced as before, the magnitudes of the measured torques remain approximately the same at 30° C. as at 80° C. Although the respective third operating points represent larger magnitudes of stator current $I_s$, which may reduce the efficiency of the motor, for many applications, the maintenance of the measured torque close to the commanded torque value is more desirable. For example, instead of the currents shifting from the initial second operating point B1 for a torque of approximately 63.7 Nm to the operating point B2 at approximately 45 Nm as in FIG. 2, the currents shift to an operating point B3 at approximately the same torque but at a greater stator current. As illustrated by a new second vector 250 extending to the operating point B3, the shift also results in a smaller increase from the initial gamma angle $\gamma_{B1}$ to a respective second gamma angle $\gamma_{B3}$ of approximately 73.3 degrees.

FIG. 4 illustrates similar shifts from the initial first operating point A1 to the new first operating point A3; from the initial third operating point C1 to the new third operating point C3; and from the initial fourth operating point D1 to the new fourth operating point D3.

Figure 5:
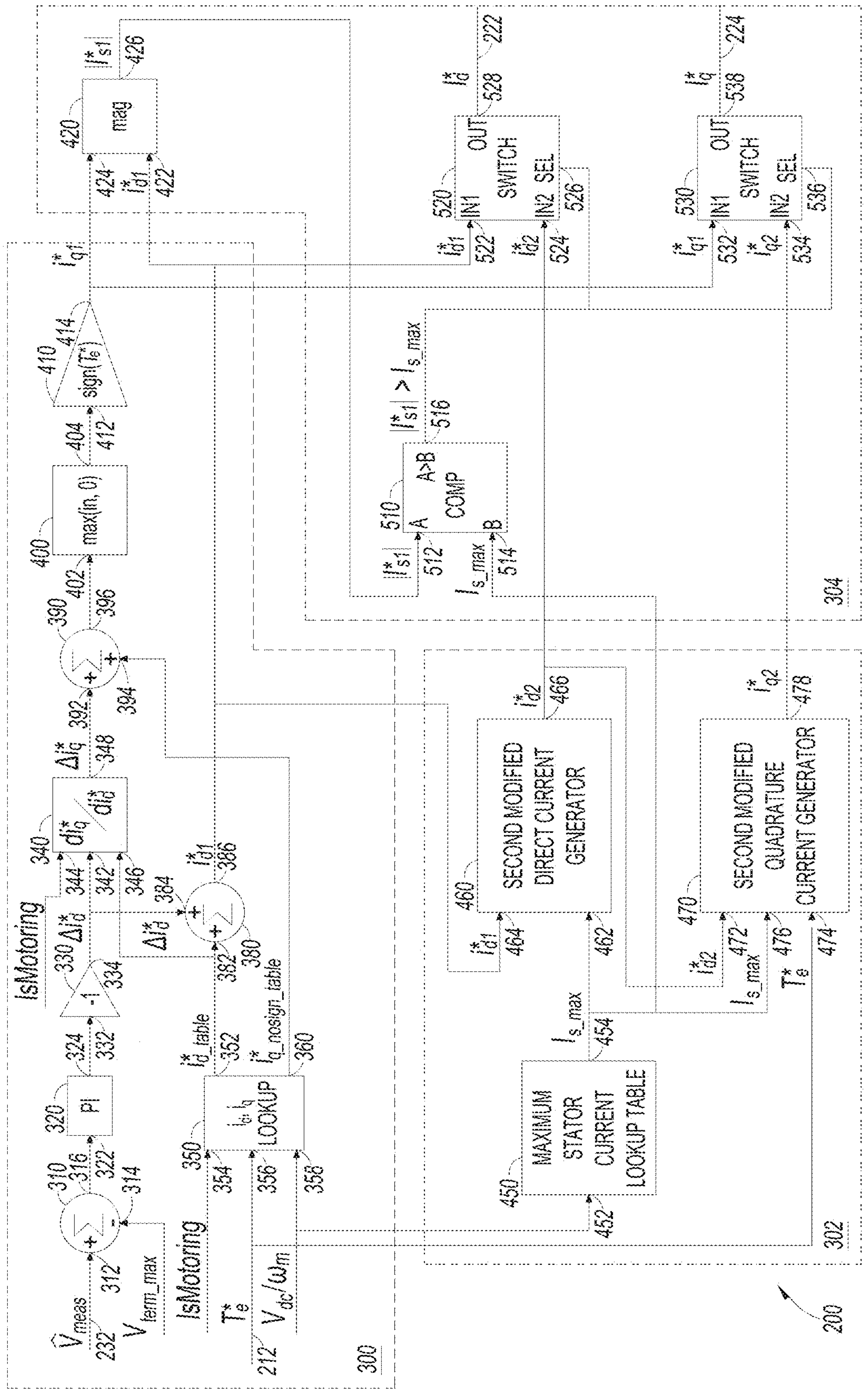
FIG. 5 illustrates a functional block diagram of the improved motor control system of FIG. 3.

The improved motor control system 200 of FIG. 3, which implements the control strategy illustrated in FIG. 4, is shown in more detail in FIG. 5. The improved motor control system is illustrated in FIG. 5 as three functional blocks: a first mode current generator 300; a second mode current generator 302; and a current selector 304. The current selector also functions as an output system 304. The functional blocks of the improved motor control system can be implemented in analog or digital hardware, in software/firmware, or in a combination of hardware and software/firmware. In the following description, the functional blocks are described as being implemented in a combination of hardware and software/firmware, and the values described below are described as digital values unless otherwise indicated.

The improved motor control system 200 is responsive to changes in the estimated measured terminal voltage $\hat{V}_{term}$ received on the third input 232 from the motor 102. The terminal voltage is identified as an estimated terminal voltage because the terminal voltage is calculated based on a commanded direct voltage $V_d$ and a commanded quadrature voltage $V_q$ from the last time instant that were applied to generate the commanded direct current $I_d$ and the commanded quadrature current $I_q$ for the last time instant. As described below, the calculated estimated measured terminal is used to generate the commanded direct current $I_d$ and the commanded quadrature current $I_q$ for the next time instant. Within the first mode current generator 300, the measured terminal voltage is applied to a noninverting (+) input 312 of a first summing function 310. The first summing function has an inverting input (−) 314 that receives a reference voltage $V_{term\_max}$. The reference voltage is an internal voltage reference within the improved motor control system and is set at a value to protect the motor 102 (FIG. 3) and represents a maximum terminal voltage for continual operation of the motor. Accordingly, the first summing function subtracts the reference voltage $V_{term\_max}$ from the measured input voltage $\hat{V}_{term}$ to generate a difference value between the two voltages on an output 316.

The difference value from the first summing function 310 is provided to an input 322 of a proportional integral (PI) function 320 that generates an integrated difference value on an output 324, which results from the integration of the difference value over time. The integrated difference value represents a change $\Delta i_d$ in the direct current command needed to respond to the increase in the measured input voltage $\hat{V}_{term}$. The PI function is constrained to only generate positive output values such that the integrated difference value is always a positive value greater than or equal to zero. The PI function is also constrained to limit the maximum positive value of the integrated difference value.

Because the quadrature current $I_d$ has a negative value, the positive integrated difference value generated by the PI function 320 is provided to an input 332 of an inverter 330, which inverts the integrated difference value to generate a value of $$\Delta i_d^*$$

on an output 334. Because of the constraints applied to the PI function 320, the $$\Delta i_d^*$$

value is either 0 or a negative value. The $$\Delta i_d^*$$

value becomes a larger negative number when the measured terminal voltage $\hat{V}_{term}$ increases above the maximum terminal voltage $V_{term\_max}$. The improved motor control system 200 responds to the $$\Delta i_d^*$$

value to reduce the measured terminal voltage to maintain the measured terminal voltage near or below the maximum terminal voltage.

The value $$\Delta i_d^*$$

from the output 334 of the inverter 330 is provided on a first input 342 of a $$\Delta i_q^*$$

generation function 340. The $$\Delta i_q^*$$

generation function also receives a IsMotoring logic signal on a second input 344, and receives an $$i_{d\_table}^*$$

value on a third input 346. The $$\Delta i_q^*$$

generation function generates a $$\Delta i_q^*$$

output value on an output 348. The IsMotoring logic signal is a logical "1" when the motor 102 is being operated as a motor and is a logical "0" when the motor is being operated as a generator.

The $$i_{d\_table}^*$$

value applied to the third input 346 of the $$\Delta i_q^*$$

generation function 340 is provided on a first output 352 of an $i_d$, $i_q$ lookup table 350. The $i_d$, $i_q$ lookup table is indexed by the IsMotoring logic signal on a first input 354, by the commanded electrical torque $T_e^*$ value on a second input 356, and by a applied voltage-to-speed ratio $V_{dc}/\omega_m$ value on a third input 358. As illustrated in FIG. 3, the commanded electrical torque $T_e^*$ value is received on the second input 212 of the improved motor control system 200. The $V_{cd}/\omega_m$ value is the applied DC voltage divided by the commanded angular velocity. The $i_{d\_table}^*$ value is a value stored in the location indexed by the three input values. The $i_d$, $i_q$ lookup table also provides a $i_{q\_nosign\_table}^*$ value on a second output 360. The $i_{q\_nosign\_table}^*$ value is also stored in the location indexed by the three input values.

The $i_{d\_table}^*$ values and the $i_{q\_nosign\_table}^*$ values stored in the $i_d$, $i_q$ lookup table 350 are generated based on the experimentally determined relationships between the commanded torque value $T_e^*$ and the voltage-to-speed ratio $V_{dc}/\omega_m$ as inputs and the commanded direct and quadrature currents as outputs. For example, in one embodiment, the commanded direct current $i_d^*$ and the commanded quadrature current $i_q^*$ are indexed by 28 torque entries for each expected voltage/speed combination.

The $\Delta i_q^*$ generation function 340 is responsive to the $\Delta i_d^*$ value on the first input 342, the IsMotoring value on the second input 344, and the $i_{d\_table}^*$ value on the third input 346 to generate a $di_q^*/di_d^*$ value as described below. The $\Delta i_d^*$ value on the first input 342 of the $\Delta i_q^*$ generation function is multiplied by the generated $di_q^* / di_d^*$ value to generate the $\Delta i_q^*$ output value on the output 348 of the $\Delta i_q^*$ generation function. As indicated above, the IsMotoring value is a logical "1" when the motor 102 is operating as a motor and is a logical "0" when the motor is operating as a generator. The IsMotoring input allows a different value to be output from the $\Delta i_q^*$ generation function depending on whether the motor is operating as a motor or operating as a generator.

The $di_q^*/di_d^*$ value is generated in accordance with the following Equation (2):

$$di_q^* / di_d^* = \frac{-K_1 * K_3}{K_3^2 (i_d^*)^2 + 2K_2 K_3 i_d^* + K_3^2} \quad (2)$$

In Equation (2), the $i_d^*$ value is the $i_{d\_table}^*$ value from the $i_d$, $i_q$ table 350.

In Equation (2), $K_1$ is determined in accordance with the following Equation (3);

$$K_1 = T_e^* \quad (3)$$

In Equation (2) $K_2$ is determined in accordance with the following Equation (4):

$$K_2 = 3/2 * pp * \lambda_{pm} \quad (4)$$

In Equation (4), pp is the number of pole pairs and $\lambda_{pm}$ is the flux density of the internal permanent magnet of the motor 102.

In Equation (2), $K_3$ is determined in accordance with the following Equation (5):

$$K_3 = 3/2 * pp * (L_d - L_q) \quad (5)$$

In Equation (5), $L_d$ is the direct inductance and $L_q$ is the quadrature inductance of the IPM motor 102.

In Equation (3), the commanded torque value $T_e^*$ is determined by the following Equation (6):

$$T_e^* = 3/2pp[\lambda_{pm} + (L_d - L_q)i_d^*]i_q^* \quad (6)$$

Equation (6) can be rearranged to provide the following Equation (7) for the value of $$i_q^* = \frac{T_e^*}{3/2pp[\lambda_{pm} + (L_d - L_q)i_d^*]} \quad (7)$$

value calculated in accordance with Equation (2) is a slope that reflects how much the quadrature current value $di_q^*$ should change with the change of the direct current value $di_d^*$.

Accordingly, the slope represents a change in the value of the quadrature current along a substantially constant torque parabola as illustrated in FIG. 4. Equation (2) shows that the $di_q^* / di_d^*$ value is a function direct current $i_d^*$, a function of the torque $T_e^*$, a function of the machine parameters pp (the number of pole pairs in the motor 102), a function $\lambda_{pm}$ (the flux density of the internal permanent magnet), $L_d$ (the d-axis inductance), and $L_q$ (the quadrature axis inductance).

The commanded direct current $i_d^*$ in the foregoing equations is the $i_{d\_table}^*$ value from the $i_d$, $i_q$ lookup table 350, which is determined in part by the commanded torque value $T_e^*$.

The determination of the multiplier $$di^*_d/di^*_q$$

can be calculated within the $$\Delta i^*_q$$

generation function 340; however, in the illustrated embodiment, the $$\Delta i^*_q$$

generation function includes a lookup table that stores previously calculated multiplier values indexed by the $$i^*_{d\_table}$$

input value.

The improved motor control system 200 further includes a second summing function 380. The second summing function has a first noninverting (+) input 382 that receives the $$i^*_{d\_table}$$

value from the first output of 352 of the $i_d$, $i_q$ lookup table 350. The second summing function has a second noninverting (+) input 384 that receives the $$\Delta i^*_d$$

value from the output 334 of the inverter 330. The second summing function generates a first modified direct current command value $$i^*_{d1}$$

on an output 386. The first modified direct current command value is the sum of the two input values as follows:

$$i^*_{d1} = i^*_{d\_table} + \Delta i^*_d \tag{8}$$

The improved motor control system 200 further includes a third summing function 390 having a first noninverting (+) input 392 that receives the $$\Delta i^*_q$$

value from the output 348 of the $$\Delta i^*_q$$

generation function 340. The third summing function has a second noninverting (+) input 394 that receives the $$i^*_{q\_nosign\_table}$$

from the second output 360 of the $i_d$, $i_q$ lookup table 350. The third summing function sums the two values to generate $$\Delta i^*_q + i^*_{q\_nosign\_table}$$

on an output 396. Because the value of $$\Delta i^*_q$$

is a negative, the sum could be a negative number if $$\Delta i^*_q$$

is too large compared to $$i^*_{q\_nosign\_table}.$$

To avoid this result, the sum from the output of the third summing function is provided to an input 402 of a first maximum function 400. The first maximum function has an output 404 that generates a 0 value or a positive value depending on the value (in) on the input. If the value on the input is greater than or equal to 0, the first maximum function outputs the input value as the output value. If the value on the input is less than 0 (i.e., is negative), the first maximum function outputs 0 as the output value.

The output value on the output 404 of the first maximum function 400 is provided to an input 412 of a sign multiplier function 410, which multiplies the output of the first maximum function by the sign of the torque value $$T^*_e.$$

the torque value is positive; and the sign multiplier function multiplies the output of the first maximum function by 1 such that a first modified quadrature current value $$i^*_{q1}$$

on an output 414 of the sign multiplier function is the same as the output of the first maximum function. When the motor is operating as a generator in the third quadrant (e.g., the motor is braking), the torque value is negative, and the sign multiplier function multiplies the output of the first maximum function by −1 such that the first modified quadrature current value $$i_{q1}^{*}$$

on the output of the sign multiplier function has the opposite sign as the input to the sign multiplier function. Accordingly, the third summing function, the first maximum function, and the sign multiplier function operate together to generate the following first modified quadrature current value $$i_{q1}^{*}: i_{q1}^{*} = \max\left[\left(i_{q_{nosign\_table}}^{*} + \Delta i_{q}^{*}\right), 0\right] * \text{sign}(T_{e}^{*}) \tag{9}$$

The $\Delta i_{d}^{*}$ value and the $$\Delta i_{q}^{*}$$

value, which are determined as described above, are used to determine an absolute magnitude $|I_s|$ of the stator current. The first modified direct current value $$i_{d1}^{*}$$

from the output 386 of the second summing function 380 is provided to a first input 422 of a stator current vector magnitude generating function 420 within the current selector 304. The first modified quadrature current value $$i_{q1}^{*}$$

from the output 414 of the sign multiplier function 410 is provided to a second input 424 of the stator current vector magnitude generating function. The stator current vector magnitude generating function has an output 426 that provides an output value representing the magnitude of the stator current resulting from the first modified direct current value $$i_{d1}^{*}$$

and the first modified quadrature current value $$i_{q1}^{*}.$$

The stator current vector magnitude generating function calculates an absolute value of a stator current $$|I_{s1}^{*}|$$

as the vector value of the first modified direct current value $$I_{d1}^{*}$$

and the first modified quadrature current value $$I_{q1}^{*}$$

in accordance with the following equation:

$$|I_{s1}^{*}| = \left|\sqrt{(I_{d1}^{*})^2 + (I_{q1}^{*})^2}\right| \tag{10}$$

Under certain conditions, the foregoing determination of the first modified direct current value $$I_{d1}^{*}$$

and the first modified quadrature current value $$I_{q1}^{*}$$

can result in a calculated stator current that violates a maximum stator current at a certain operating speed and applied voltage. The improved motor control system 200 includes additional functions to prevent the stator current from exceeding the maximum stator current.

Within the second mode current generator 302, a maximum stator current lookup table 450 has an input 452 that receives the $V_{dc}/\omega_m$ value, which is also applied to the third input 358 of the $i_d$, $i_q$ lookup table 350 as described above. The maximum stator current lookup table has a plurality of $I_{s\_max}$ values stored in locations indexed by the $V_{dc}/\omega_m$ value. The maximum stator current lookup table outputs the indexed $I_{s\_max}$ value on an output 454.

The $I_{s\_max}$ value on the output 454 of the maximum stator current lookup table 450 is provided to a first input 462 of a second modified direct current generator function 460. The first modified direct current value $$I_{d1}^{*}$$

from the output 386 of the second summing function 380 is provided to a second input 464 of the second modified direct current generator function. The second modified direct current generator function has an output 466. The second modified direct current generator function operates as a second maximum function to provide a second modified direct current $$I_{d2}^{*}$$

on the output as follows:

$$i_{d2}^* = \max(i_{d1}^*, -I_{s\_max}) \quad (11)$$

In Equation (11), the first modified quadrature current value $$I_{d1}^*$$

is a negative number and the maximum stator current $I_{s\_max}$ is a positive number. Thus, Equation (11) compares the negative value of the quadrature current with the negative value of the stator current. Accordingly, since both values are negative, a negative stator current having a smaller absolute magnitude will be mathematically greater than a negative quadrature current having a larger absolute magnitude. Thus, the smaller $-I_{s\_max}$ value will be output from the second modified direct current generator function as a negative second modified direct current $$I_{d2}^*$$

value. If the absolute magnitude of the negative first modified quadrature current value is less than the absolute magnitude of the maximum stator current the first modified quadrature current value is output from the second modified direct current generator function as the negative second modified direct current value $$I_{d2}^*.$$

Thus, the absolute magnitude of the second modified direct current is a smaller of the absolute magnitude of the first modified direct current value and the absolute magnitude of a maximum stator current value.

The improved motor control system 200 further includes a second modified quadrature current generator function 470 that generates a second modified quadrature current value $$I_{d2}^*.$$

The second modified quadrature current generator function has a first input 472 that receives the second modified direct current value $$I_{d2}^*$$

from the output 466 of the second modified direct current generator function 460. The second modified quadrature current generator function has a second input 474 that receives the commanded torque value $$T_e^*.$$

The second modified quadrature current generator function has a third input 476 that receives the maximum stator current $I_{s\_max}$ value from the output 454 of the maximum stator current lookup table 450. The second modified quadrature current value generator function generates the second modified quadrature current value $$I_{d2}^*$$

on an output 478 as a vector difference between the maximum stator current and the second modified quadrature current in accordance with the following Equation (12):

$$i_{q2}^* = \text{sign}(T_e^*)\sqrt{I_{s\_max}^2 - (i_{d2}^*)^2} \quad (12)$$

When the sign of the torque $$T_e^*$$

is positive, the second modified quadrature current value $$i_{q2}^*$$

is positive with the motor 102 operating in the second quadrant. When the sign of the torque is negative, the second modified quadrature current value is negative with the motor operating in the third quadrant. As discussed above with respect to Equation (11), the second modified quadrature current is constrained by the maximum value of the stator current. Thus, the value within the square root function in Equation (12) will always be a positive number or a value of 0.

The first modified direct current value $$i_{d1}^*$$

and the first modified direct current value $$i_{q1}^*$$

are used to control the motor 102 when the calculated stator current $$|I_{s1}^*|$$

(as determined by the stator current vector magnitude generating function 420 based on the first modified current values) does not exceed the maximum stator current $I_{s\_max}$ at the combination of voltage ($V_{dc}$) and angular velocity ($\omega_m$) applied to the motor. If the calculated values for the first modified direct current value $$i_{d1}^{*}$$

and the first modified direct current value $$i_{q1}^{*}$$

cause the calculated stator current $$|I_{s1}^{*}|$$

value to be greater than the maximum stator current $I_{s\_max}$ value, then the second modified current values $$i_{d2}^{*} \text{ and } i_{q2}^{*}$$

are applied to the motor as described below.

The selection of the currents to apply to the motor 102 is performed by the current selector 304 of the improved motor control system 200. In addition to the 420 described above, the current selector includes a comparator 510 having a first (A) input 512, a second (B) input 514, and an output 516. The output is active when the first (A) input is greater than the second (B) input (i.e., A>B).

The current selector 304 further includes a first logic-controlled selector switch 520 having a first (IN0) input 522, a second (IN1) input 524, a control (SEL) input 526, and an output 528. The first logic-controlled selector switch has a first switch position that electrically connects the first input 522 to the output 528 when the logic signal on the control input is a logic "0." The first logic-controlled selector switch has a second switch position that electrically connects the second input 524 to the output 528 when the logic signal on the control input is a logic "1."

The current selector 304 further includes a second logic-controlled selector switch 530 having a first value (IN0) input 532, a second value (IN1) input 534, a control (SEL) input 536, and an output 538. The second logic-controlled selector switch has a first switch position that electrically connects the first input 532 to the output 538 when the logic signal on the control input is a logic "0." The first logic-controlled selector switch has a second switch position that electrically connects the second input 534 to the output 538 when the logic signal on the control input is a logic "1."

The first input 512 of the comparator 510 receives the absolute value $$|I_{s1}^{*}|$$

of the stator current from the output 426 of the stator current vector magnitude generating function 420. The second input 514 of the comparator receives the maximum stator current $I_{s\_max}$ value from the output 454 of the maximum stator current lookup table 450. If the absolute value $$|I_{s1}^{*}|$$

of the stator current on the first input of the comparator is less than or equal to the maximum stator current $I_{s\_max}$ value, the output of the comparator is a logical "0." If the absolute value of the stator current greater than the maximum stator current value, the output of the comparator is a logical "1." The logic signal on the output 516 of the comparator 510, is provided to the control input 526 of the first logic-controlled selector switch 520 and to the control input 536 of the second logic-controlled switch 530.

The first (IN0) input 522 of the first logic-controlled selector switch 520 is connected to the output 386 of the second summing function 380 to receive the first modified direct current value $$i_{d1}^{*}.$$

The first (IN0) input 532 of the second logic-controlled selector switch 530 is connected to the output 414 of the sign multiplier function 410 to receive the first modified quadrature current value $$i_{q1}^{*}.$$

Thus, when the absolute value $$|I_{s1}^{*}|$$

of the stator current is less than or equal to the maximum stator current $I_{s\_max}$ value such that the output 516 of the comparator 510 is a logical "0," the first modified direct current value is coupled to the output 528 of the first logic-controlled selector switch as the commanded direct current $$I_{d}^{*},$$

which is provided to the motor 102 via the second output 222 of the improved motor control system 200. Similarly, the first modified quadrature current value is coupled to the output 538 of the second logic-controlled selector switch as the commanded quadrature current $$I_{q}^{*},$$

which is provided to the motor via the third output 224 of the improved motor control system.

The second (IN1) input 524 of the first logic-controlled selector switch 520 is connected to the output 466 of the second modified direct current generator function 460 to receive the second modified direct current value $$i_{d2}^{*}.$$

The second (IN1) input 534 of the second logic-controlled selector switch 530 is connected to the output 478 of the second modified quadrature current value generator function 470 to receive the second modified quadrature current value $$i_{q2}^{*}.$$

Thus, when the absolute value $$|I_{s1}^{*}|$$

of the stator current is greater than the maximum stator current $I_{s\_max}$ value such that the output 516 of the comparator 510 is a logical "1," the second modified direct current value is coupled to the output 528 of the first logic-controlled selector switch as the commanded direct current $$I_{d}^{*},$$

which is provided to the motor 102 via the second output 222 of the improved motor control system 200. Similarly, the second modified quadrature current value is coupled to the output 538 of the second logic-controlled selector switch as the commanded quadrature current $$I_{q}^{*},$$

which is provided to the motor via the third output 224 of the improved motor control system.

The commanded direct current $$i_{d}^{*}$$

and the commanded quadrature current $$i_{q}^{*}$$

are values that may be digital values or analog values as discussed above. The motor 102 may include external or internal current control circuitry (not shown) responsive to the values to control the actual direct current and quadrature current within the motor to achieve the commanded values.

The current selector 304 implements the two modes of operation of the improved motor control system 200. When the calculated stator current magnitude $$|I_{s1}^{*}|$$

output from the stator current vector magnitude generating function 420 is less than or equal to the maximum stator current $I_{s\_max}$, the current selector causes the first modified direct current value $$i_{d1}^{*}$$

and the first modified quadrature current value $$i_{q1}^{*}$$

to be provided as the commanded currents $$I_{d}^{*}, I_{q}^{*},$$

on the second output 222 and the third output 224, respectively, to the motor 102. The two values are generated from values in the $i_d$, $i_q$ lookup table 350 and are selected to maintain the commanded torque value $$T_{e}^{*}$$

substantially constant while allowing the stator current to vary. Thus, the improved motor control system implements the algorithm illustrated in FIG. 4. If the stator current increases because of colder operating conditions, for example, such that the calculated stator current magnitude $$|I_{s1}^{*}|$$

becomes greater than the maximum stator current $I_s$ max, the current selector causes the second modified direct current value $$i_{d2}^{*}$$

and the second modified quadrature current value $$i_{q2}^{*}$$

to be provided to the motor and begins implementing the algorithm illustrated in FIG. 2. The improved motor control system enables the motor to operate with a substantially constant torque over a broader range of temperatures of the permanent magnet.

When the internal operating temperature of the motor 102 is at or close to a normal range (e.g., around 80° C.), the stator current is sufficiently low such that the measured estimated terminal voltage $\hat{V}_{term}$ on the noninverting (+) input 312 of the first summing function 310 remains at or below the a maximum terminal voltage $V_{term\_max}$ on the inverting (−) input 314 of the first summing function. Under this condition, the $$\Delta i_{d}^{*}$$

value on the output 334 of the inverter 330 is 0 and the $$\Delta i_q^*$$

value on the output 348 of the $$\Delta i_q^*$$

generation function 340 is also 0. Thus, the magnitudes of first modified direct current value $$i_{d1}^*$$

and the first modified quadrature current value $$i_{q1}^*$$

and the corresponding magnitudes of the applied direct current value $$i_d^*$$

and the applied quadrature current value $$i_q^*$$

will be the same as the corresponding output values from the $i_d$, $i_q$ lookup table 350.

Figure 6:
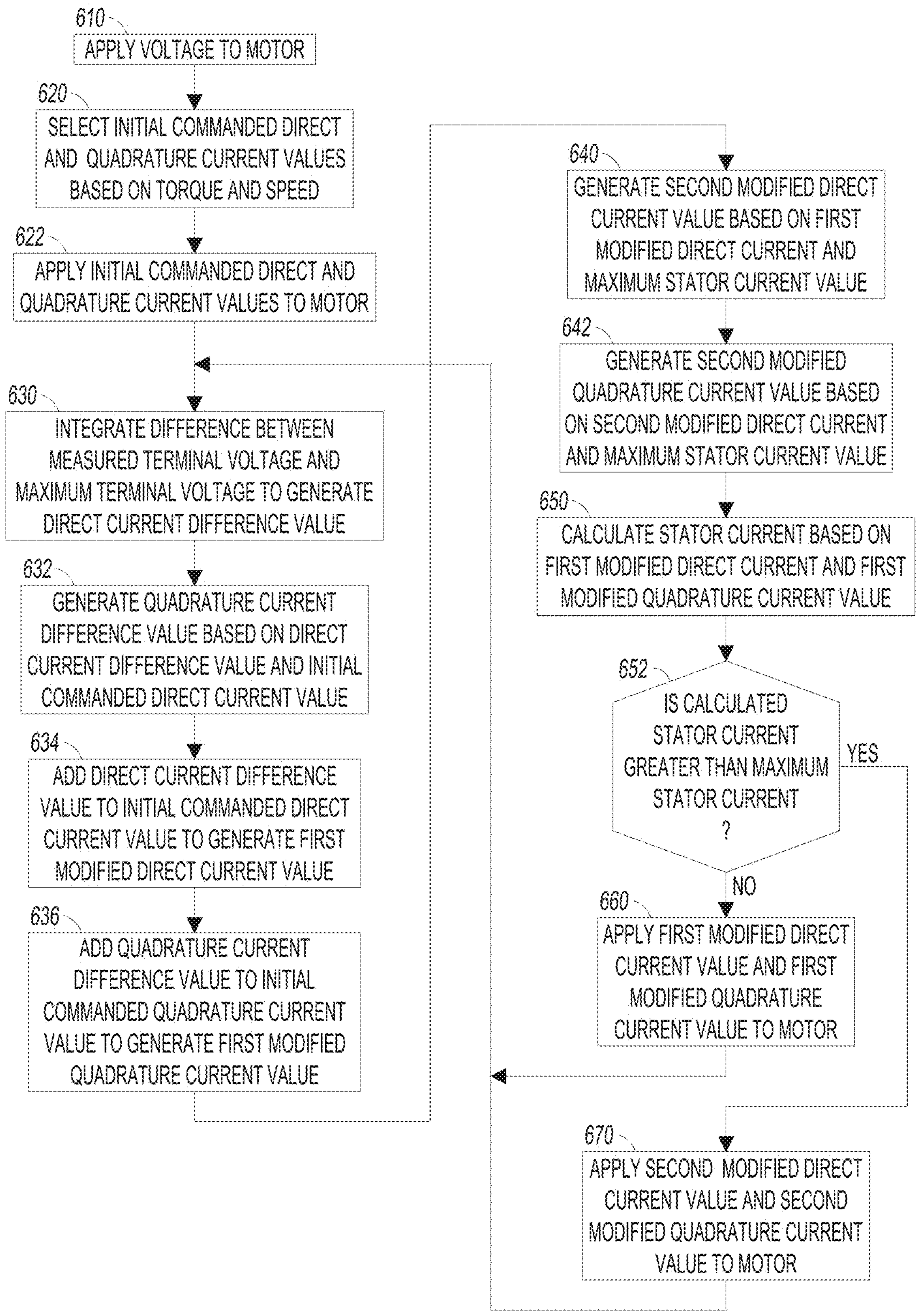
FIG. 6 illustrates a flowchart of the operation of the improved motor control system of FIG. 5.

The operation of the improved motor control system 200 of FIG. 5 is illustrated by a flowchart of a procedure 600 of FIG. 6. In a first action block 610, the voltage $V_{dc}$ is applied to the motor 102. In a second action block 620, the initial direct current value and the initial quadrature current value from the $i_d$, $i_q$ lookup table 350 are selected as the initial commanded current values to apply to the motor to start the motor because no measurements have occurred as a basis for modifying the currents. In a third action block 622, the commanded direct and quadrature currents are applied to the motor.

In a fourth action block 630, the difference between the measured terminal voltage $\hat{V}_{term}$ and the maximum terminal voltage $V_{term\_max}$ is integrated and used to generate the direct current difference value $$\Delta i_d^*.$$

In a fifth action block 632, the direct current difference value and the initial commanded direct current value $$i_{d\_table}^*$$

are used to generate the quadrature current difference value $$\Delta i_q^*$$

in accordance with the Equation (2). In a sixth action block 634, the direct current difference value is added to the initial commanded direct current value to generate the first modified direct current value $$i_{d1}^*.$$

In a seventh action block 636, the quadrature current difference value is added to the initial commanded quadrature current value to generate the first modified quadrature current value $$i_{q1}^*.$$

In an eighth action block 640, the second modified direct current value $$i_{d2}^*$$

is generated based on the first modified quadrature current value $$i_{d1}^*$$

and the maximum stator current value $$|I_{s1}^*|.$$

In a ninth action block 642, the second modified quadrature current value $$i_{q2}^*$$

is generated based on the second modified direct current value and the maximum stator current value.

In a tenth action block 650, the stator current value $$|I_{s1}^*|$$

is calculated based on the vector sum of the first modified direct current value $$i_{d1}^*$$

and the first modified quadrature current value $$i^*_{qi}.$$

In a decision block 652, the calculated stator current value is compared to the maximum stator current value $I_{s\_max}$. If the calculated stator current value is not greater than the maximum stator current value, the procedure 600 advances from the decision block to an eleventh action block 660 wherein the first modified direct current value $$i^*_{d1}$$

and the first modified quadrature current value $$i^*_{d2}$$

are applied to the motor 102. If the calculated stator current value is greater than the maximum stator current value, the procedure advances to a twelfth action block 670 wherein the second modified direct current value $$i^*_{d2}$$

and the second modified quadrature current value $$i^*_{d2}$$

are applied to the motor. After either the eleventh action block 660 or the twelfth action block 670, the procedure returns to the fourth action block 630 wherein the procedure again measures the terminal voltage and integrates a positive difference to generate the direct current difference value $$\Delta i^*_d.$$

As described herein, the improved motor control system 200 of FIG. 5 executes the procedure 600 of FIG. 6 to respond to increased measured terminal voltages in two modes. When the generation of the first modified direct current value and the first modified quadrature current value results in a calculated stator current value no greater than the maximum stator current value, the system and procedure operate in the first mode to apply the first modified direct current value and the first modified quadrature current value as the applied current values to the motor 102 to maintain a substantially constant torque. When the calculated stator current value exceeds the maximum stator current value, the system and procedure operate in the second mode to apply the second modified direct current value and the second modified quadrature current value to the motor to maintain the stator current below the maximum stator current value.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A system for controlling the direct current and the quadrature current applied to an internal permanent magnet (IPM) motor to achieve a desired rotational speed and a desired torque over a range of internal operating temperatures of the motor without exceeding a maximum stator current, wherein an increase in stator current causes an increase in a measured terminal voltage, the system comprising:

a first current generator configured to respond to a measured terminal voltage in excess of a maximum terminal voltage to modify an initial direct current magnitude to a first modified direct current magnitude and to modify an initial quadrature current magnitude to a first modified quadrature current magnitude;

a second current generator configured to generate a second modified direct current having a magnitude as a maximum of the first modified direct current magnitude and a maximum stator current magnitude and further configures to generate a second modified quadrature current magnitude responsive to a vector difference between the second modified direct current magnitude and the maximum stator current magnitude; and a current selector responsive to a calculated stator current magnitude based on the first modified direct current magnitude and the first modified quadrature current magnitude, wherein:

the current selector operates in a first mode when the calculated stator current magnitude is no greater than the maximum stator current magnitude, and routes the first modified direct current magnitude and the first modified quadrature current magnitude to the motor; and the current selector operates in a second mode when the calculated stator current magnitude is greater than the maximum stator current magnitude, and routes the second modified current magnitude and the second modified quadrature current magnitude to the motor.

2. A method for controlling the direct current and the quadrature current applied to an internal permanent magnet (IPM) motor to achieve a desired rotational speed and a desired torque over a range of internal operating temperatures of the motor without exceeding a maximum stator current, the method comprising:

applying a voltage to the motor;

selecting an initial commanded direct current value and an initial commanded quadrature current value based on the desired rotational speed and the desired torque;

applying the initial commanded direct current value and the initial commanded quadrature current value to the motor;

comparing a measured terminal voltage of the motor with a maximum terminal voltage, the terminal voltage varying with the internal operating temperature of the motor; and when the measured terminal voltage exceeds the maximum terminal voltage:

generating a direct current differential value responsive to a difference between the measured terminal voltage and the maximum terminal voltage;

generating a quadrature current differential value in response to the direct current differential value;

adjusting the initial commanded direct current value to a first modified direct current value in response to the direct current differential value;

adjusting the initial commanded quadrature current value to a first modified quadrature current value in response to the quadrature current differential value; and applying the first modified direct current value and the first modified quadrature current value to the motor.

3. The method of claim 2, further comprising:

generating a calculated absolute magnitude of the stator current value as the vector sum of the first modified direct current value and the first modified quadrature current value;

generating a second modified direct current value having an absolute magnitude that is a smaller of an absolute magnitude of the first modified direct current value and an absolute magnitude of a maximum stator current value;

generating a second modified quadrature current value having an absolute magnitude that is a vector difference of the magnitude of the maximum stator current value and the second modified direct current value;

comparing the calculated magnitude of the stator current value to a maximum magnitude of the stator current value; and selectively applying the second modified direct current value and the second modified quadrature current value to the motor when the calculated magnitude of the stator current value exceeds the maximum magnitude of the stator current value.

4. A system for controlling the direct current and the quadrature current applied to an internal permanent magnet (IPM) motor to achieve a desired rotational speed and a desired torque over a range of internal operating temperatures of the motor without exceeding a maximum stator current, wherein an increase in stator current causes an increase in a measured terminal voltage, the system comprising:

an initial current value generator that generates an initial direct current value and an initial quadrature current value responsive to a selected input voltage, a selected speed, and a selected torque;

an integrator that integrates a difference in the measured terminal voltage in excess of a maximum terminal voltage and generates a direct current difference value;

a quadrature current difference generator that receives the direct current difference value and that generates a quadrature current difference value;

a first modified direct current generator that adds the direct current difference value to the initial direct current value to generate a first modified direct current value;

a first modified quadrature current generator that adds the quadrature current difference value to the initial quadrature current value to generate a first modified quadrature current value; and an output system that applies the first modified direct current value as an applied direct current value to the motor and that applies the first modified quadrature current value as an applied quadrature current value to the motor.

5. The system of claim 4, further comprising:

a second modified direct current generator that generates a second modified direct current value having an absolute magnitude that is the lesser of an absolute magnitude of the first modified direct current value and an absolute magnitude of a maximum stator current value;

a second modified quadrature current generator that generates a second modified quadrature current value having an absolute magnitude that is a vector difference between the maximum stator current value and the second modified quadrature current value; and a current selector in the output system having a first mode and a second mode, wherein:

in the first mode, the current selector selects the first modified direct current value as the applied direct current value and selects the first modified quadrature current value as the applied quadrature current value; and in the second mode, the current selector selects the second modified direct current value as the applied direct current value and selects the second modified quadrature current value as the applied quadrature current value.

6. The system of claim 5, wherein:

the current selector operates in the first mode when the calculated stator current magnitude is no greater than the maximum stator current magnitude; and the current selector operates in the second mode when the calculated stator current magnitude is greater than the maximum stator current magnitude.

7. The system of claim 5, wherein the maximum stator current value is stored in a lookup table indexed by a selected torque, a selected speed, and a selected applied voltage.

8. The system of claim 4, wherein the initial current value generator comprises a lookup table that stores a plurality of initial direct current values and a plurality of initial quadrature current values indexed by a selected torque, a selected speed, and a selected applied voltage.

* * * * *